US010401714B2

(12) United States Patent
Aiello et al.

(10) Patent No.: US 10,401,714 B2
(45) Date of Patent: Sep. 3, 2019

(54) QUICK SWAP TOP MOUNTABLE CAMERA MOUNT SYSTEMS

(71) Applicant: Panavision International, L.P., Woodland Hills, CA (US)

(72) Inventors: Dominick Aiello, Oak Park, CA (US); Haluki Sadahiro, Oak Park, CA (US); Trach Nguyen, Sylmar, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 14/591,864

(22) Filed: Jan. 7, 2015

(65) Prior Publication Data

US 2015/0219982 A1   Aug. 6, 2015

Related U.S. Application Data

(60) Provisional application No. 61/924,379, filed on Jan. 7, 2014.

(51) Int. Cl.
*F16M 11/04* (2006.01)
*F16M 13/04* (2006.01)
*G03B 17/56* (2006.01)
*H01R 13/639* (2006.01)
*H04N 5/225* (2006.01)

(52) U.S. Cl.
CPC ......... *G03B 17/563* (2013.01); *F16M 11/041* (2013.01); *F16M 13/04* (2013.01); *G03B 17/561* (2013.01); *G03B 17/566* (2013.01); *H01R 13/639* (2013.01); *H04N 5/2252* (2013.01)

(58) Field of Classification Search
CPC .................................................... G03B 17/563
See application file for complete search history.

(56) References Cited

U.S. PATENT DOCUMENTS

| 3,612,462 | A | 10/1971 | Mooney et al. |
| 5,390,578 | A * | 2/1995 | Raymer ................... G10D 3/06 84/267 |
| 5,737,657 | A | 4/1998 | Paddock et al. |
| 5,801,774 | A | 9/1998 | Seo |
| 6,686,967 | B1 | 2/2004 | Yamamoto |

(Continued)

FOREIGN PATENT DOCUMENTS

| JP | 2012134815 | 7/2012 |
| JP | 2013074599 | 4/2013 |

(Continued)

OTHER PUBLICATIONS

PCT; International Search Report and Written Opinion dated Jun. 11, 2015 in Application No. PCT/US2015/010536.

Primary Examiner — Noam Reisner
(74) Attorney, Agent, or Firm — Snell & Wilmer L.L.P.

(57) ABSTRACT

In contrast to the traditional transitions used in systems that switch over a camera with a handheld top mount to a low mode mount, a quick swap top mountable camera mount system includes a quick swap handheld top mount, a quick swap mounting plate, and a quick swap low mode mount. Unlike traditional methods and components, fewer pieces are required to be removed and replaced due, in part, to the use of quick swap coupling elements, which allow various types of mounts to quickly and easily decouple from the quick swap mounting plate.

20 Claims, 19 Drawing Sheets

(56) References Cited

U.S. PATENT DOCUMENTS

| | | | | |
|---|---|---|---|---|
| 6,805,997 | B1* | 10/2004 | Katayama | 429/123 |
| 2009/0002524 | A1* | 1/2009 | Desorbo | H04N 5/225 |
| | | | | 348/231.99 |
| 2009/0116831 | A1* | 5/2009 | Lindsay | 396/301 |
| 2009/0257741 | A1 | 10/2009 | Greb et al. | |
| 2014/0093314 | A1* | 4/2014 | Kessler et al. | 403/361 |
| 2014/0233934 | A1* | 8/2014 | Aiello et al. | 396/419 |

FOREIGN PATENT DOCUMENTS

| | | |
|---|---|---|
| WO | 1996031050 | 10/1996 |
| WO | 2007125305 | 11/2007 |
| WO | 2013086173 | 6/2013 |
| WO | 2015105922 | 7/2015 |

* cited by examiner

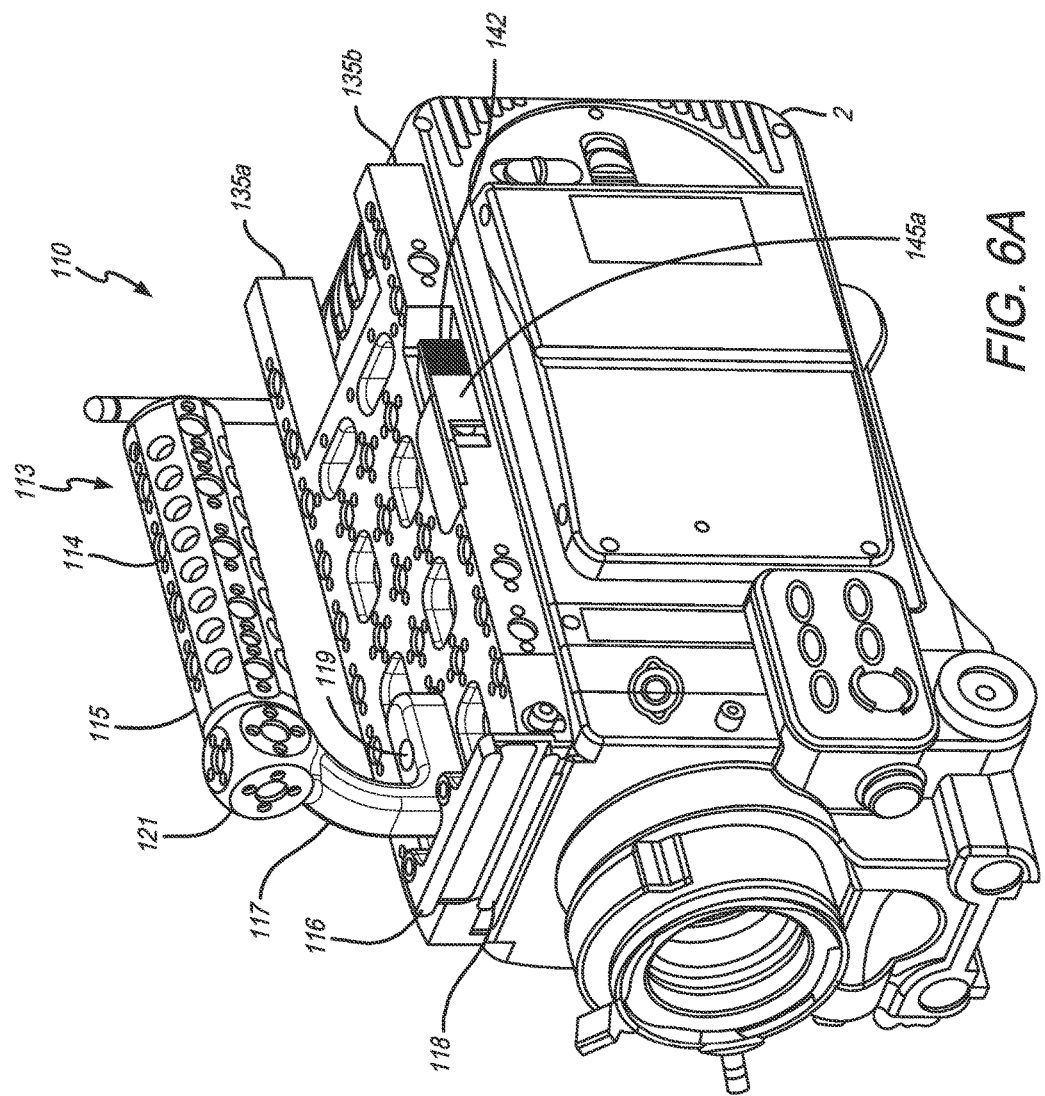

QUICK SWAP TOP MOUNTABLE CAMERA MOUNT SYSTEMS

CROSS-REFERENCE TO RELATED APPLICATIONS

This patent application claims priority pursuant to 35 U.S.C. § 119(e) to U.S. Provisional Patent Application No. 61/924,379, filed Jan. 7, 2014, which application is incorporated herein in its entirety, by reference.

FIELD OF THE INVENTION

The field of the present invention is camera mount systems, and particularly camera mount systems that permit a camera to be quickly and easily transferred between different types of camera mounts positioned on top of a camera.

BACKGROUND

Switching between different types of top-mounted camera mounts can be a source of delay during filming. It can easily take several minutes to disconnect a camera from one top mount and then reconnect the camera to another top mount, depending, in part, upon mount types and fasteners used.

Body-mounted camera stabilizing systems, such as the STEADICAM® line of camera stabilizing systems, sold by The Tiffen Company of Hauppauge, N.Y., and competing systems sold by Xtended Camera Support Inc. of Thousand Oaks, Calif. and GPI Pro Systems of Valencia, Calif. (collectively hereinafter, body-mounted camera stabilizing systems are referred to as "Steadicam systems" or singularly as a "Steadicam system"), often include a low mode mount, which is mounted onto the top of a camera. Unfortunately, changing over from an initial top mount to the low mode mount of a Steadicam system involves several steps.

The steps involved during the changeover from an initial top mount to a low mode mount can delay production. And these delays easily run up the cost of filming. While camera crews are working diligently to changeover camera top mounts, others on set are often left standing around until the changeover is complete. A system that enables the camera crew to quickly changeover from one type of camera top mount to a low mode mount of a Steadicam system is, therefore, desirable.

SUMMARY

Quick swap top mountable camera mount systems as disclosed herein, comprise a quick swap mounting plate including an outer body portion having long sides and short sides, wherein each long side includes a male alignment element and at least one long side includes a raised lip, and an inner body portion having a plurality of bores. The camera mount systems further comprise a quick swap handheld top mount configured to mate with the quick swap mounting plate. The quick swap handheld top mount comprises a quick swap accessory plate with an accessory plate platform, having an accessory plate channel configured to receive the quick swap mounting plate, the channel including a female alignment element that mates with the male alignment element of the quick swap mounting plate and one or more quick swap coupling elements configured to engage the quick swap mounting plate. In an example, the one or more quick swap coupling elements comprise at least one quick release and lock mechanism.

The camera mount systems may further comprise one or more of a handle connected to a top surface of the accessory plate platform, a quick swap low mode mount configured to mate with the quick swap mounting plate. In an example, the quick swap low mode mount comprises a docking block and one or more mount adjustment elements. The camera mount systems may further comprise a power distribution plate configured to mate with the quick swap mounting plate. In an example, the power distribution plate comprises at least one quick release and lock mechanism. In an example, the power distribution plate comprises a power distribution plate channel configured to receive the quick swap mounting plate, the power distribution plate channel including a female alignment element that mates with the male alignment element of the quick swap mounting plate. In an example, the power distribution plate includes a side wall having a series of undulations.

BRIEF DESCRIPTION OF THE DRAWINGS

The drawings described herein are for illustrative purposes only and not intended to limit the scope of the present disclosure.

FIG. 6A shows a camera assembled with a quick swap mounting plate and handheld top mount.

DETAILED DESCRIPTION

Figure 1:
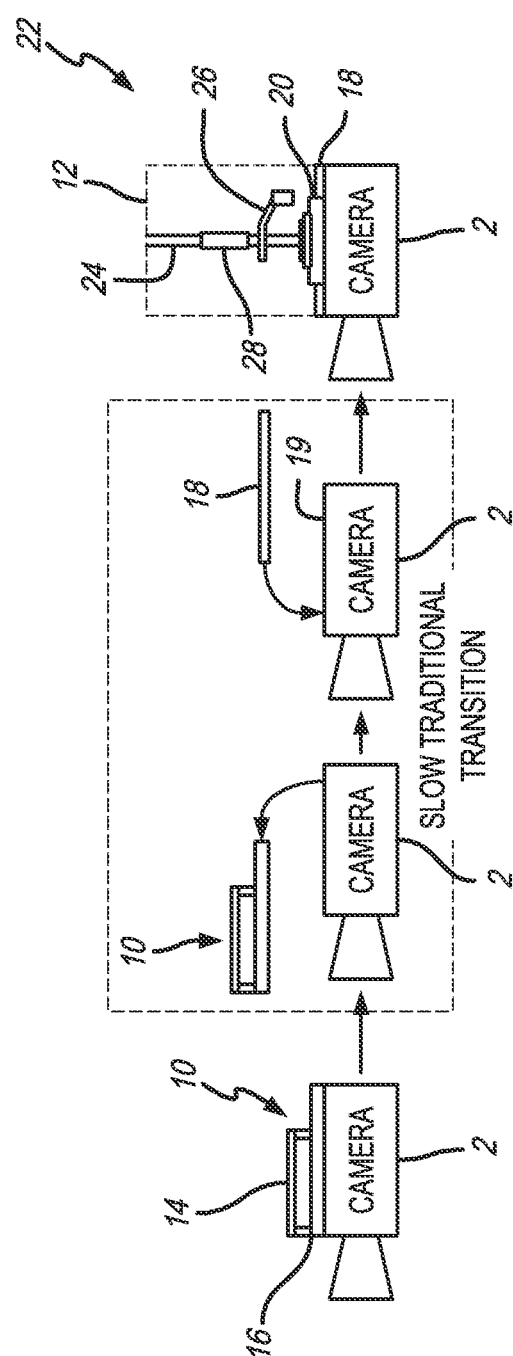
FIG. 1 schematically illustrates a traditional method for changing over from a handheld top mount to a low mode mount of a Steadicam system.

FIG. 1 schematically shows a prior art method and prior art components used to change over a camera 2 with a handheld top mount 10 to a low mode mount 12 of a Steadicam system. The handheld top mount 10 includes a camera handle 14 and a camera top accessory plate 16, which is attached to the handle. To change mount types, according to this prior art method, the accessory plate 16 of the handheld top mount 10 is screwed onto and off of the camera 2. After removal of the handheld top mount 10, a mounting plate 18 is screwed onto the camera top 19. The camera top 19 typically includes threads such that it is configured to receive screws. Finally, the low mode mount 12 is attached, using fastening elements (not shown).

A low mode mount 12 of a Steadicam system includes, among other elements, a docking block 20 and various mount adjustment elements 22. Mount adjustment elements 22 include, but are not limited to a shaft 24 that is mounted onto the docking block, a control handle 26 disposed on the shaft 24, and at least one gripping element 28. The docking block 20 is attached to the camera mounting plate 18, using fasteners (e.g. sliding dovetails). The time it takes to transition from a handheld mount to a low mode mount, using this method and these components is considerable and typically occurs in four or more stages, as illustrated in FIG. 1.

Figure 2:
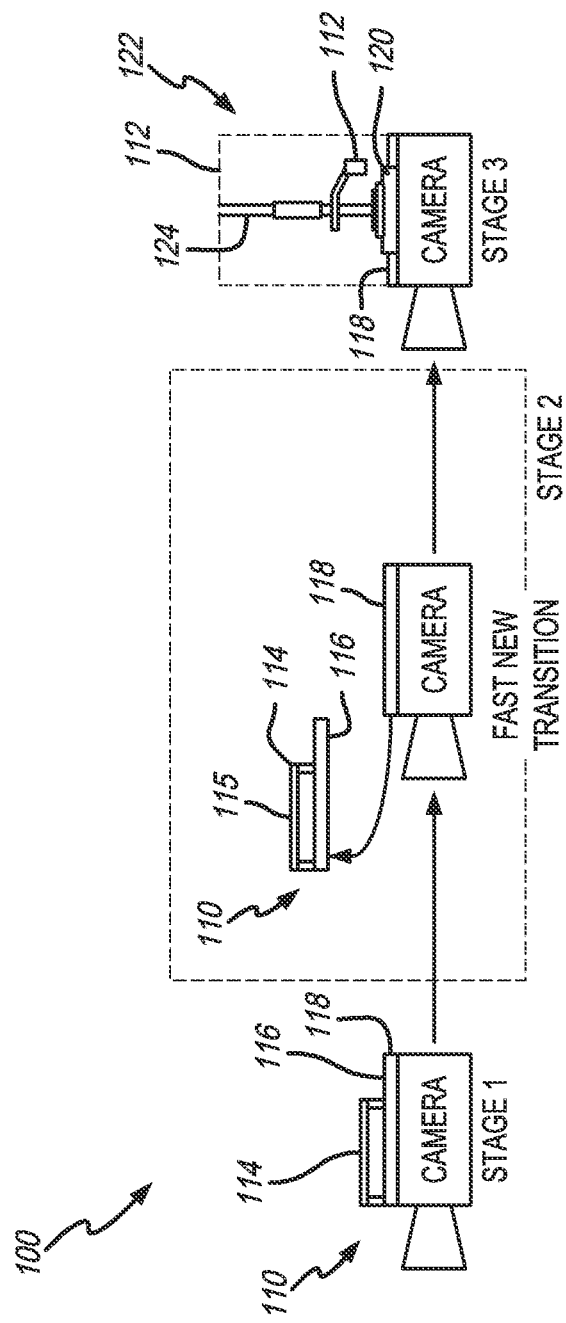
FIG. 2 schematically illustrates one embodiment of a quick swap top mountable camera mount system, which enables quick changes between a quick swap handheld top mount and a quick swap low mode mount.

In contrast to the traditional transitions used in systems that switch over a camera with a handheld top mount to a low mode mount, FIG. 2 schematically shows stages of one embodiment of a quick swap top mountable camera mount system 100. Generally, there are three (3) stages in this system configuration which allow a changeover from an initial mount type over to a subsequent mount type. This system configuration, however, should not be construed as limiting. The system is designed to be user-friendly and promote interchangeability with other elements, which may be incorporated into a quick swap top mountable camera mount system.

Elements of the system configuration 100 shown in FIG. 2 generally include a quick swap handheld top mount 110 (Stages 1-2), a quick swap mounting plate 118 (Stages 1-3), and a quick swap low mode mount 112 (Stage 3). Like the traditional method and components, the system 100 is used to changeover a handheld top mount 110 over to a low mode mount 112. But, unlike the traditional method and components, fewer pieces are required to be removed and replaced due, in part, to the use of quick swap coupling elements, which allow various types of mounts to quickly and easily decouple from the quick swap mounting plate.

Figure 4:
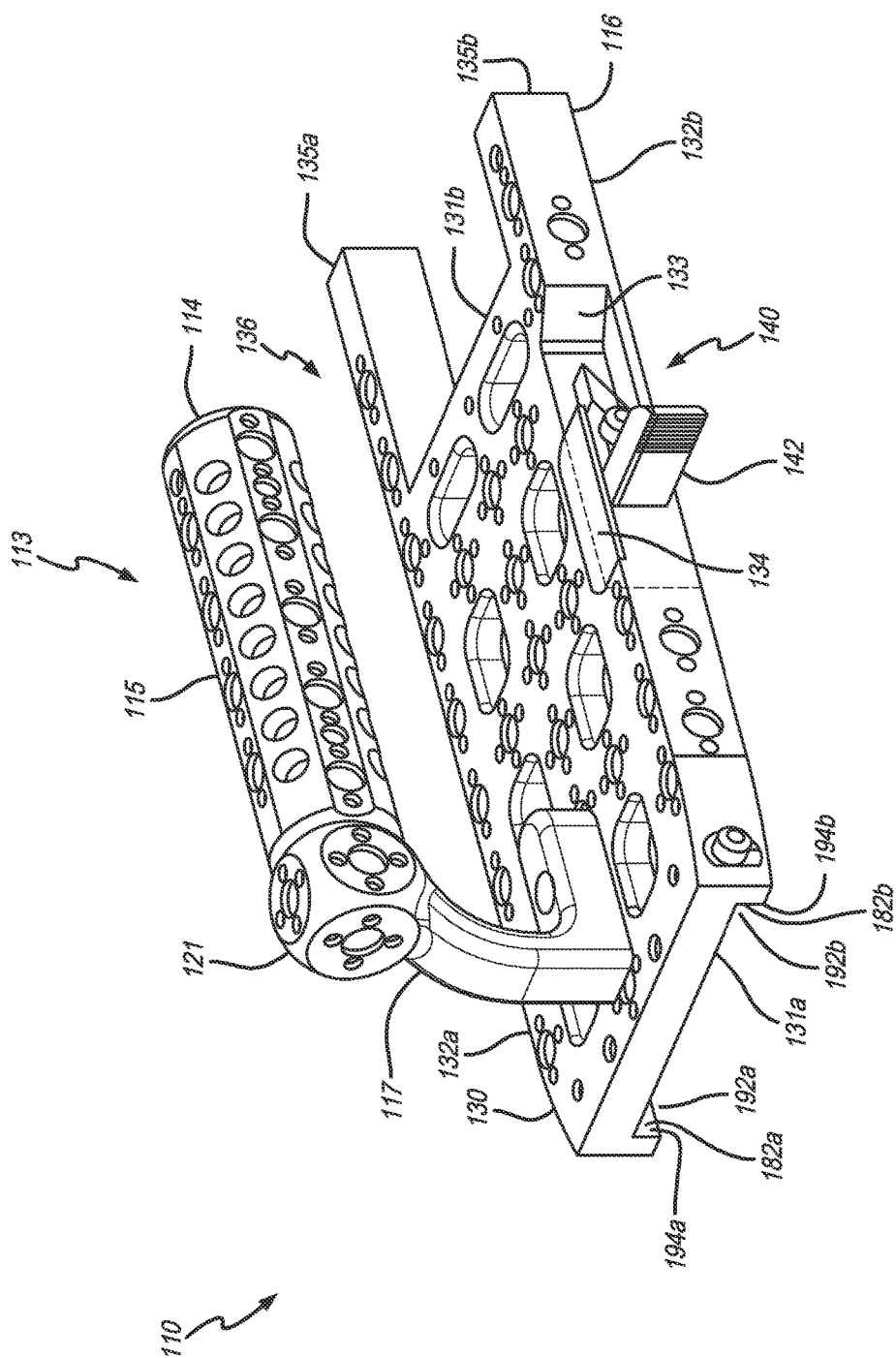
FIG. 4 shows one configuration of a quick swap handheld top mount, including a camera handle and a quick swap camera top accessory plate.

In this improved system, the quick swap handheld top mount 110 includes a handle 114 and a quick swap camera top accessory plate 116, which is connected to the handle. And exemplary quick swap handheld top mount 110 is shown in FIG. 4. The handle 114 may include a plurality of bores 113 for overall lightening of the handheld top mount 110 and an extending arm 117. The extending arm 117 extends from a connecting end 121 of the handle 114 and connects the handle to a mount surface of a plate (e.g. the accessory plate), using at least one fastener 119.

The handle 114 includes at least one gripping area 115, which allows a cameraman to carry the camera by hand. The quick swap camera top accessory plate 116 also includes one or more quick swap coupling elements 140 that allow the accessory plate 116 to mate with the mounting plate 118. These coupling elements 140 include at least one quick release and lock mechanism 142 that allows the accessory plate 116 to decouple from the mounting plate 118, as further described below. The handle 114 and the quick swap camera top accessory plate 116 may be either two separate pieces, which are connected together or integrated pieces, i.e. meaning that the handle and plate are molded or machined from one generally contiguous material.

Referring back to FIG. 2, Stage 1 of the system is shown with the handheld top mount 110 coupled to the quick swap mounting plate 118. In this stage, the quick swap mounting plate 118 is positioned under the handheld top mount 110. Stage 2 is shown with the handheld top mount 110 removed from the quick swap mounting plate 118. Preferably, the handheld top mount 110 is slidably engaged with the quick swap mounting plate 118, although other methods of engagement may be used. Stage 3 is shown with the quick swap low mode mount 112 coupled to the quick swap mounting plate 118.

Figure 3:
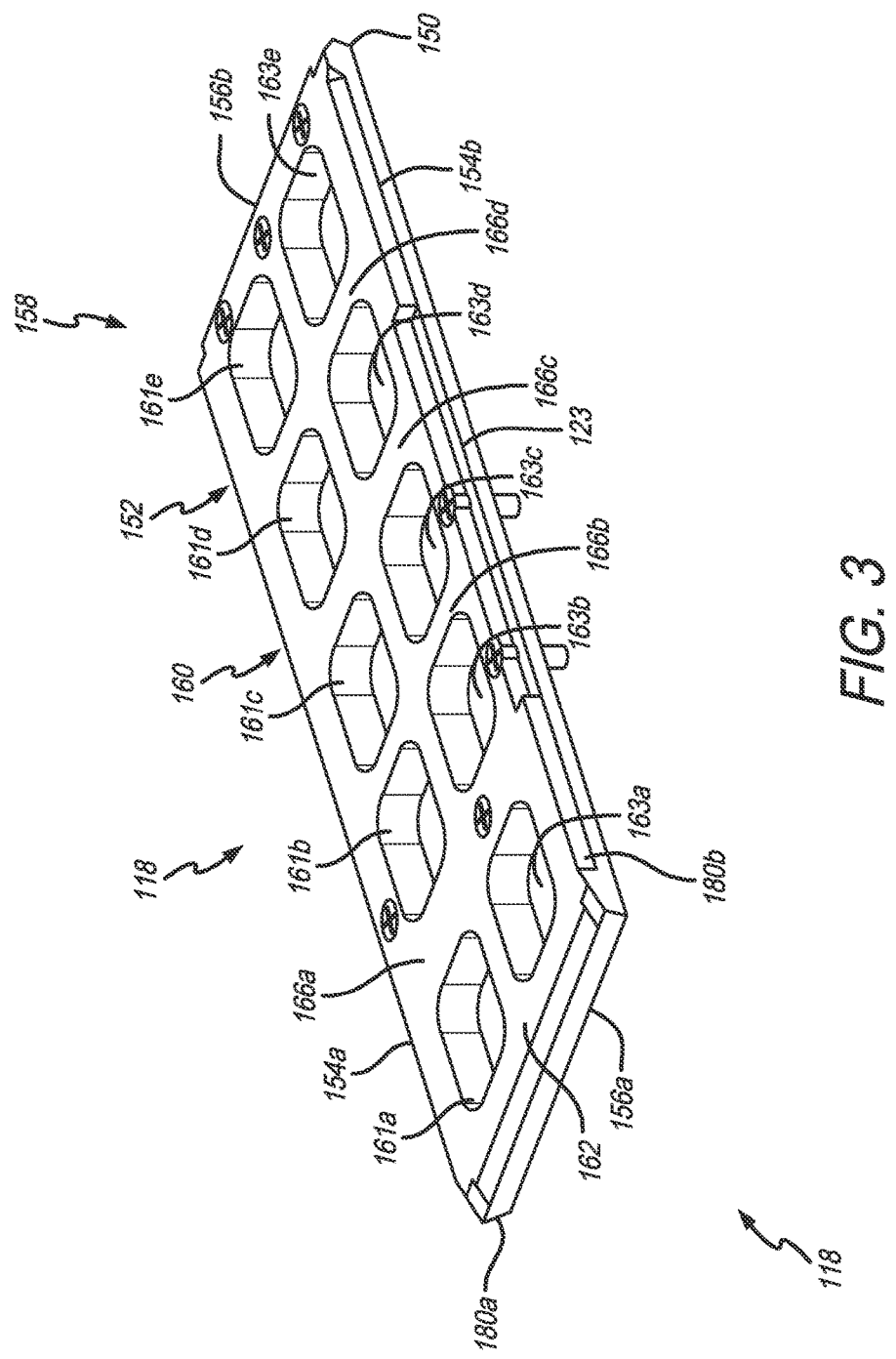
FIG. 3 shows one configuration of a quick swap mounting plate.

FIG. 3 shows one configuration of a quick swap mounting plate 118. This plate is preferably utilized through each stage of the system 100. In this configuration, the mounting plate 118 includes an outer body portion 150 with a plurality of sides 152. Here, the outer body portion 150 includes four sides—long sides 154a, 154b and short sides 156a, 156b. The inner body portion 158 has a plurality of quadrants 160, which each quadrant including an opening 161a, 161b, 161c, 161d, 161e, 163a, 163b, 163c, 163d, 163e for weight reduction purposes. This configuration of the mounting plate includes ten quadrants. Fewer or more quadrants, however, may be provided. Each quadrant is bounded by sides of the outer body portion, a central strip 162, which extends between short sides 156a, 156b and lateral structural elements 166a, 166b, 166c, 166d, which extend between long sides 154a, 154b. The inner body portion also includes a plurality of bores 170 with each bore having threads for coupling with fasteners and mounting onto a camera top (See, e.g., FIG. 6A).

Coupled to long sides 154a, 154b, respectively, are a primary male alignment element 180a and a secondary male alignment element 180b with the secondary male alignment element 180b including a raised lip 123. These male alignment elements and the raised lip 123 engage or interlock with the accessory plate and other alternative system plates, as further described below. A male alignment element may also be configured with a dovetail like shape, which includes an angular or curved side surface. The positioning and configuration of the male alignment elements, however, should not be construed as limiting. One or more male alignment elements may have alternative positioning and configurations, depending, in part, on overall the structural configuration required for positioning on top of the camera.

As shown particularly in FIG. 4, a quick swap accessory plate 116 includes an accessory plate platform 130, having a generally rectangular shape. The platform 130 is bounded by a front platform end 131a, a rear platform end 131b, a first platform side 132a, and a second platform side 132b. The second platform side 132b includes the quick release and lock mechanism 142, which is fitted partially within a cavity 133 (represented in part by dashed lines shown in FIG. 4) on the second platform side 132b of the platform. A cover 134 is positioned partially over the cavity to protect the interior components of the quick release and lock mechanism 142. Extending from the platform 130 are plate extensions 135a, 135b. And disposed on the platform 130 and the plate extensions is a plurality of apertures 136 of various sizes and shapes. These apertures are incorporated into the platform and plate extensions to lighten the overall load of the accessory plate 116. The apertures may also provide attachment points for coupling the accessory plate to the camera 2 and the mounting plate 118.

The accessory plate platform 130 also includes a channel 129 configured to receive the quick swap mounting plate 118. Disposed within the channel 129 are a primary female alignment element 182a and a secondary female alignment element 182b. These female alignment elements are configured to couple with the quick swap mounting plate 118, as shown in FIG. 6A. Profiled surfaces 192a, 192b of each female alignment element respectively form a primary socket 194a and a secondary socket 194b. The primary socket 194a has as a complementary shape to receive the primary male alignment element of the quick swap mounting plate. Similarly, the secondary socket 194b has as a complementary shape to receive the secondary male alignment element 180b of the quick swap mounting plate 118.

Figure 5:
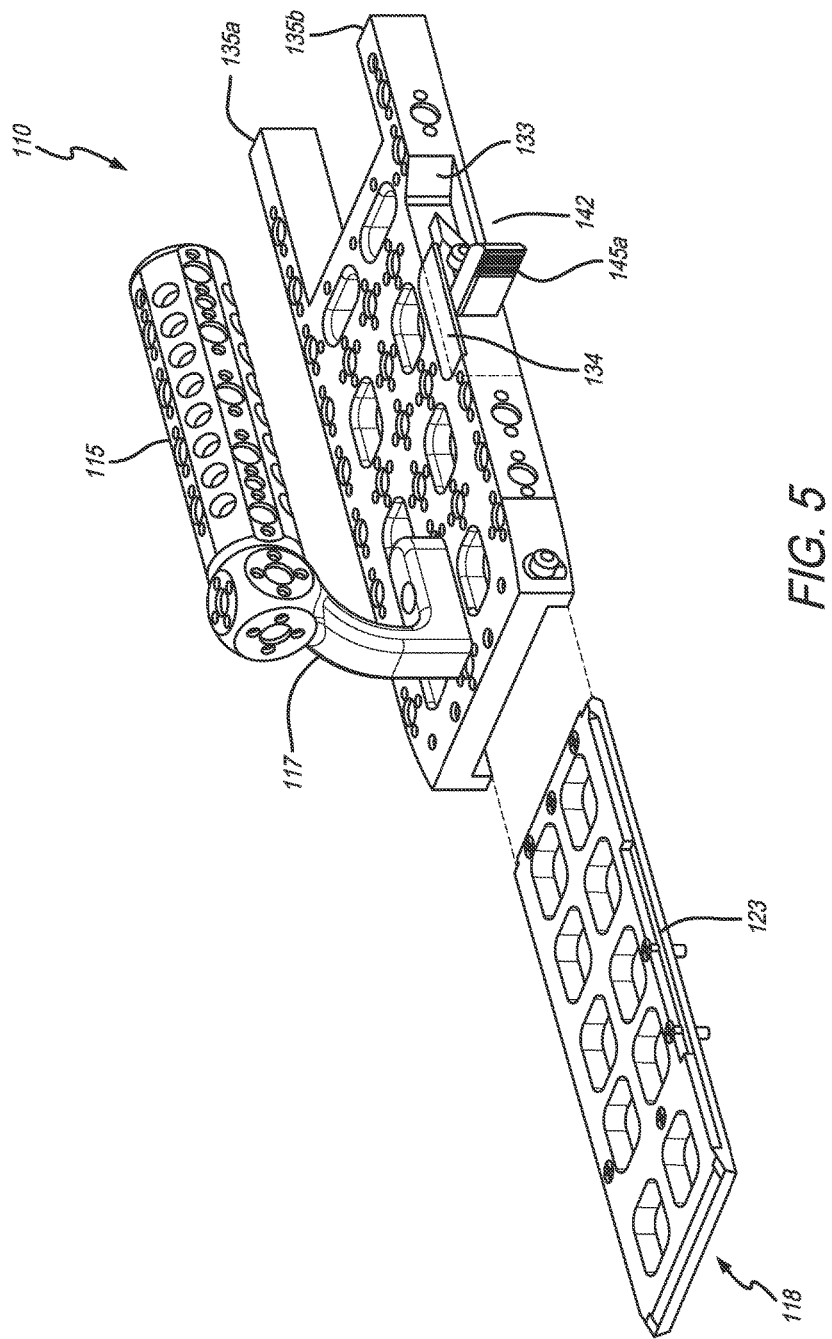
FIG. 5 shows the quick swap handheld top mount shown in FIG. 4 in alignment with the quick swap mounting plate shown in FIG. 3.
Figure 6B:
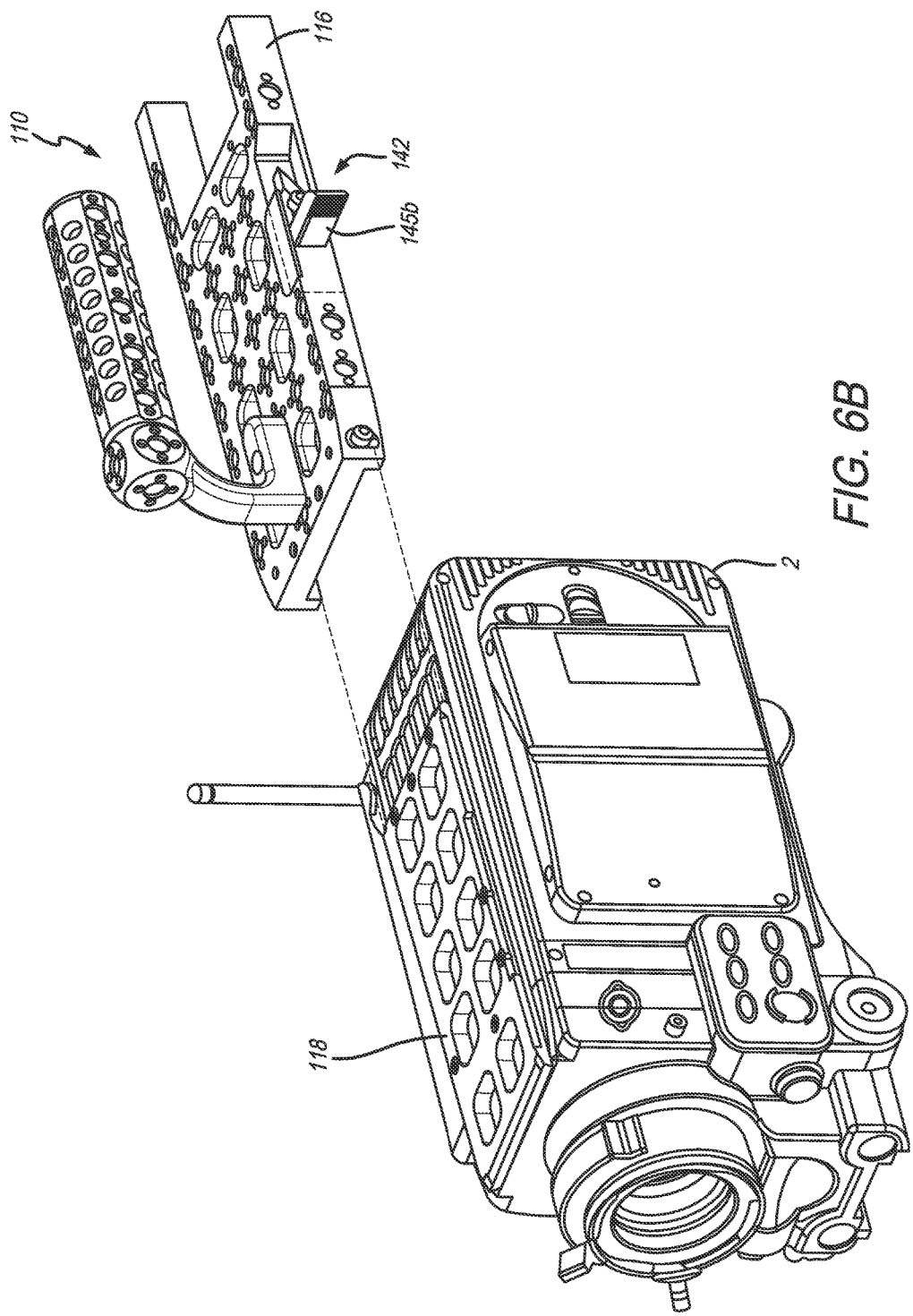
FIG. 6B shows a camera in alignment with a quick swap mounting plate and handheld top mount assembly.

FIGS. 5 and 6B show how the quick swap mounting and accessory plates may be aligned before assembly. And, FIGS. 6A and 6B, in particular, illustrate the transition of the system 100 from Stage 1 to Stage 2 and particularly how a quick swap handheld top mount 110 and the quick swap mounting plate 118 may be coupled to and decoupled from a camera 2. To initiate the transition and the coupling and decoupling of the quick swap handheld top mount, a quick release and lock mechanism 142 is activated.

Referring particularly to FIGS. 5, 6A, 6B, and 12, the quick release and lock mechanism 142 is activated by a lever 144 coupled to one or more rotary elements 146 fitted within the cavity 133. A rotary element 146 acts an axle, by engaging both the lever 144 and a block 148 positioned within the cavity 133 of the quick swap camera top accessory plate 116. The rotary element 146 rotates and moves the block 148 downwardly and inwardly toward the quick mounting plate 118. A user activates this motion, by moving the lever 144 from a first position 145a (shown in FIGS. 5 and 6B) to a second position 145b (shown in FIG. 6A). Decoupling of the accessory plate 116 from the mounting plate 118 is achieved by activating the quick swap release and lock mechanism 142 and then sliding the accessory plate 116 off of the quick swap mounting plate 118 (shown in FIG. 6B).

Figure 7:
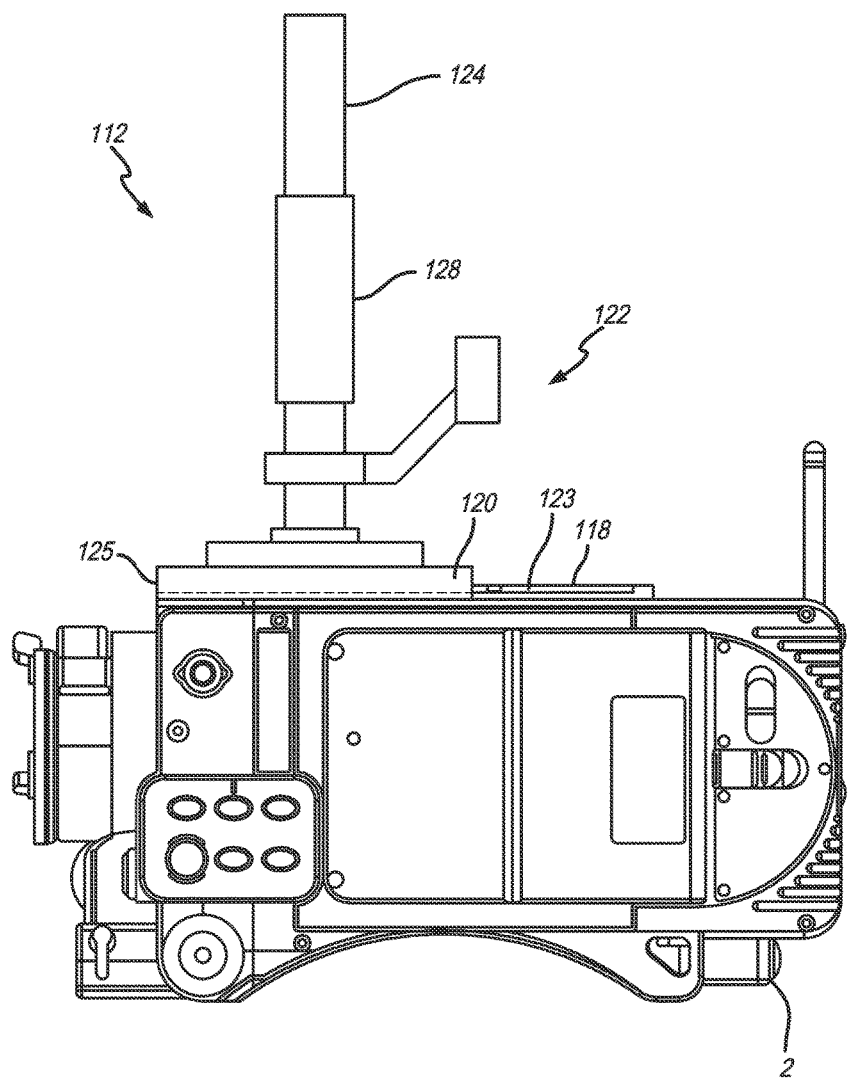
FIG. 7 shows a quick swap low mode mount coupled to a camera and a quick swap mounting plate.

FIG. 7 shows one configuration of a quick swap mounting plate 118 assembled to a quick swap low mode mount 112. After the quick swap handheld top mount 110 is removed from the quick swap mounting plate 118, as shown in FIG. 6B, the quick swap low mode mount 112 may positioned onto the mounting plate 118. The quick swap low mode mount 112 includes, among other elements, a docking block 120 and mount adjustment elements 122. Mount adjustment elements 122 include, but are not limited to a shaft 124 that is mounted onto the docking block, a control handle 126 disposed on the shaft 124, and at least one gripping element 128. A channeled underside 125 of docking block 120 preferably interlocks with the raised lip 123 of the quick swap mounting plate 118. Alternatively or in addition to the raised lip, coupling of the mounting plate 118 and the docking block 120 may be achieved using screws and/or other fasteners.

FIGS. 3-7 show one version of a quick swap top mountable camera mount system 100, represented by the schematic shown in FIG. 2. FIGS. 8A-11 show alternative components and arrangements, which may be used with quick swap top mountable camera mount systems. These alternative components/arrangements may include a first-type power distribution plate 203 and an alternate accessory plate 303.

Figure 8A:
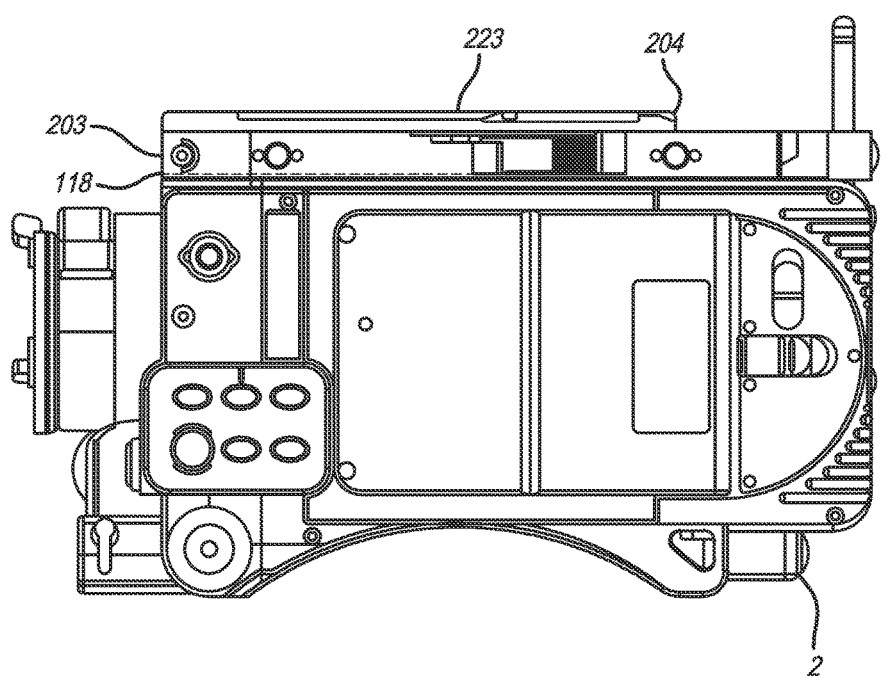
FIG. 8A shows a quick swap mounting plate, power distribution plate and camera assembly.
Figure 8B:
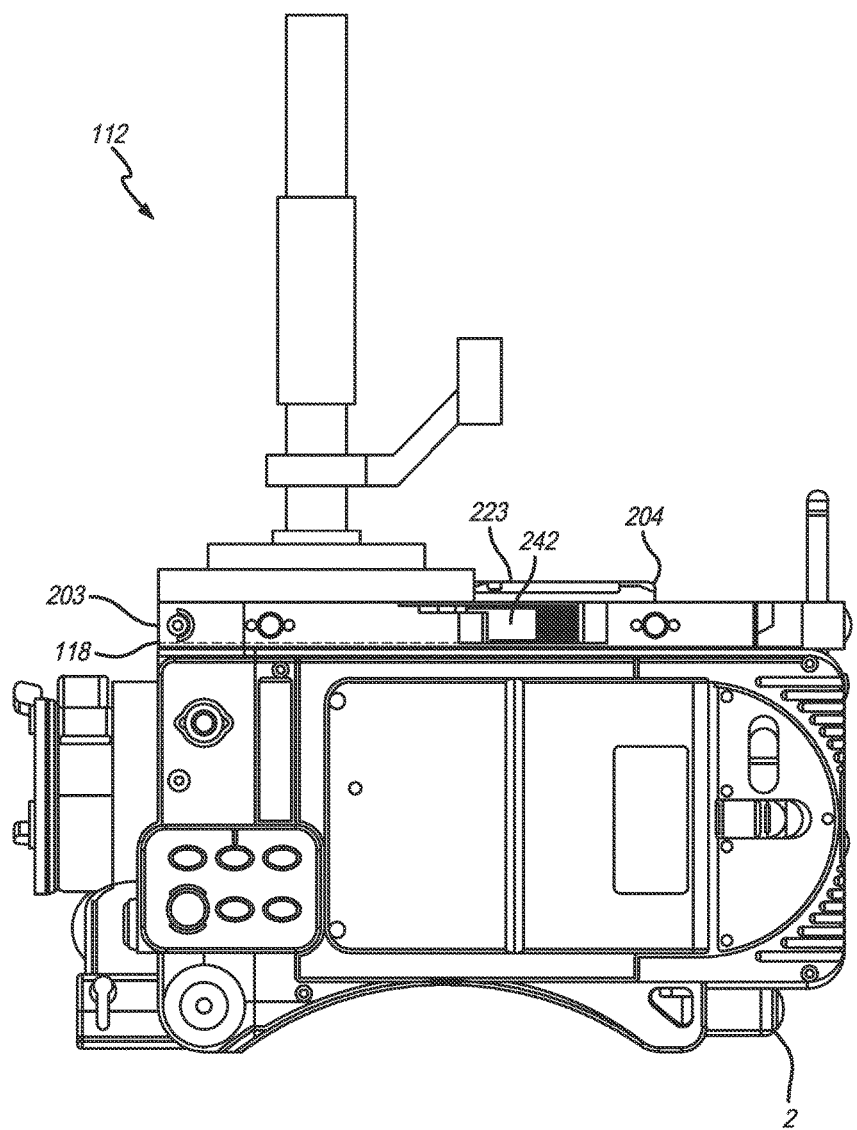
FIG. 8B shows the power distribution plate and camera assembly shown in FIG. 8A coupled to a quick swap low mode mount.
Figure 8C:
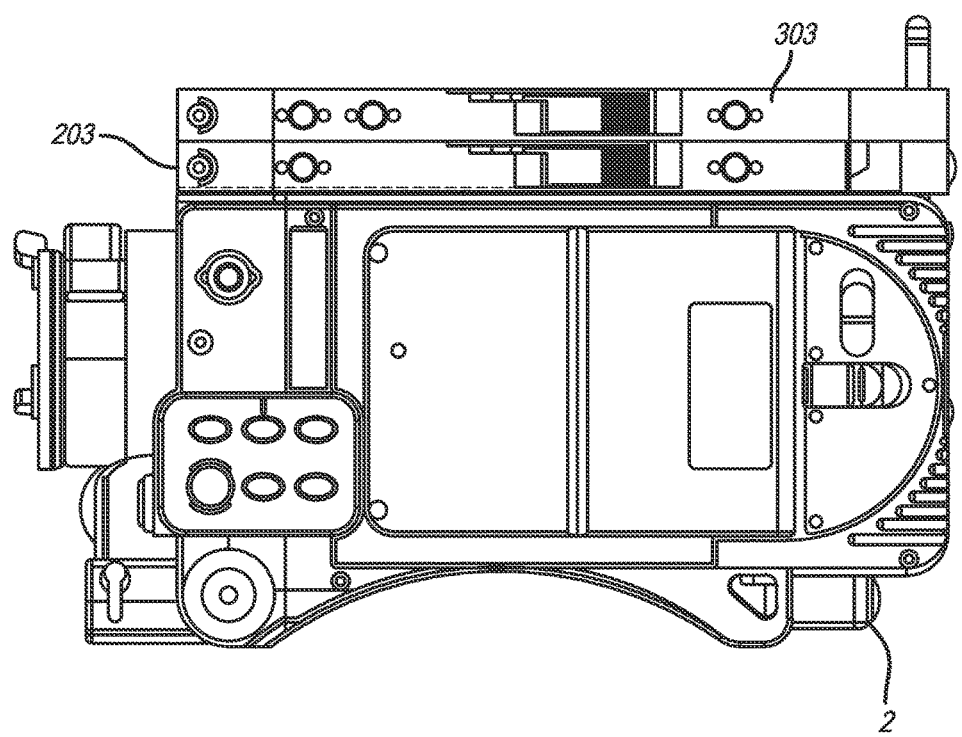
FIG. 8C shows a power distribution plate positioned on top of an alternate accessory plate, which is mounted to a camera, using a quick swap mounting plate.
Figure 12:
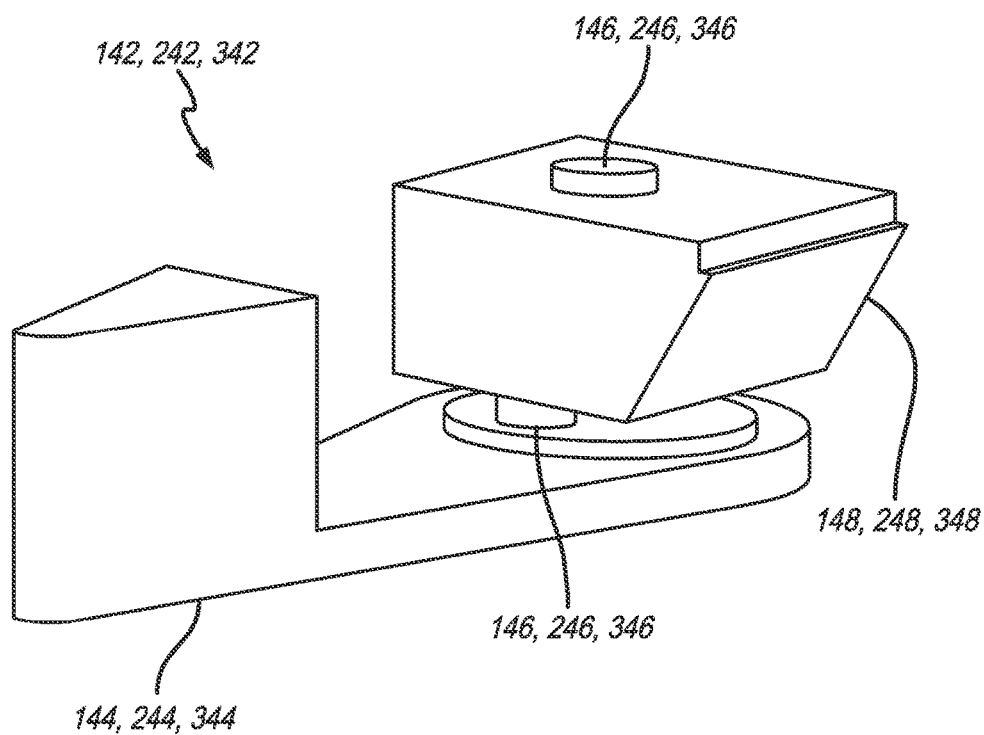
FIG. 12 shows an embodiment of a quick release and lock mechanism, which may be incorporated into a quick swap camera top accessory plate, a power distribution plate, or an accessory plate.

Either the power distribution plate 203, the alternate accessory plate 303 or the accessory plate 116 of a handheld top mount 110 may be coupled to and positioned atop a quick swap mounting plate 118 (represented by dashed lines shown in FIG. 8A). The power distribution plate 203 includes a power distribution plate mounting surface 204, having a plurality of apertures 236 of various sizes and shapes. These apertures are incorporated into the mounting surface 204 to lighten the overall load of the power distribution plate 203 and/or provide attachment points for coupling the power distribution plate 203 to other system components. Like the mounting plate 118, the mounting surface 204 includes a raised lip 223, which can interlock with either a handheld top mount, an accessory plate alone or a low mode mount (FIG. 8B). Each plate 203, 303 also includes at least one quick release and locking mechanism 242, a cavity 233, and a cover 234 and has the same elements as the release and lock mechanism incorporated into the accessory plate 116, as shown in FIG. 12. These elements include and a lever 244, one or more rotary elements 246 and a block 248. In an alternative arrangement, as shown in FIG. 8C, two plates 203, 303 may be stacked.

FIGS. 9A-10C, show a power distribution plate 302, including a plate mounting surface 304 on a power distribution plate platform 330. The power distribution plate 302 also includes a plurality of apertures 336 of various sizes, a raised lip 323, and at least one quick release and lock mechanism 342 with a cover 334. Like the accessory plates, the apertures are provided to lighten the overall load and/or provide attachment points for coupling the power distribution plate to other system components.

The power distribution plate platform 330 includes a front platform end 331a and a rear platform end 331b, a power distribution plate channel 329 configured to receive the quick swap mounting plate, a primary female alignment element 382a and a secondary female alignment element 382b. These female alignment elements are further configured to couple with the quick swap mounting plate 118. Profiled surfaces 392a, 392b of each female alignment element respectively form a primary socket 394a and a secondary socket 394b. The primary socket 394a has as a complementary shape to receive the primary male alignment element 180a of the quick swap mounting plate. Similarly, the secondary socket 394b has as a complementary shape to receive the secondary male alignment element 180b of the quick swap mounting plate 118.

The power distribution plate also includes a side wall 305 with a series of formations 306. These formations are configured to house power connectors for power distribution.

Figure 9A:
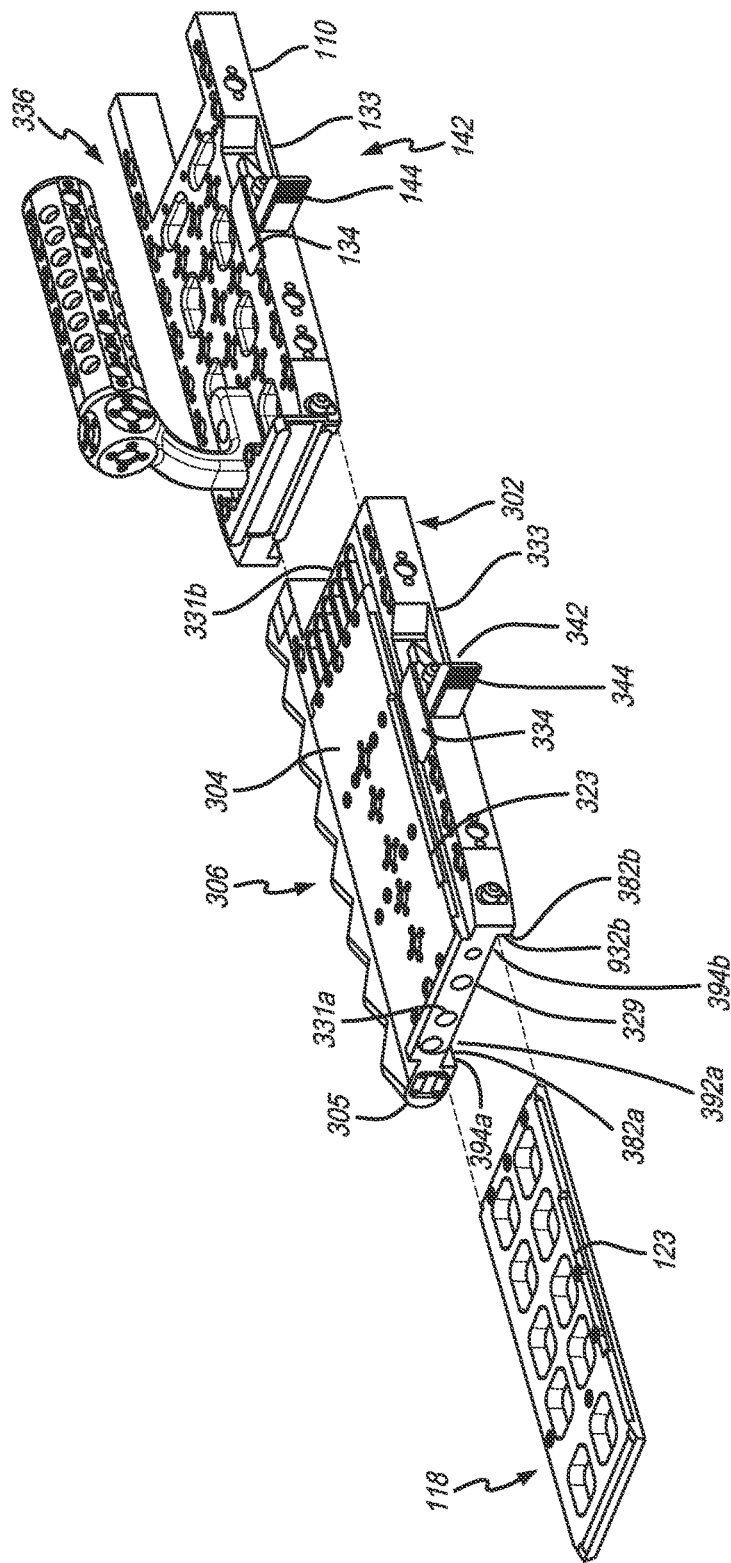
FIG. 9A shows a quick swap mounting plate and quick swap handheld top mount in alignment with a power distribution plate.
Figure 9B:
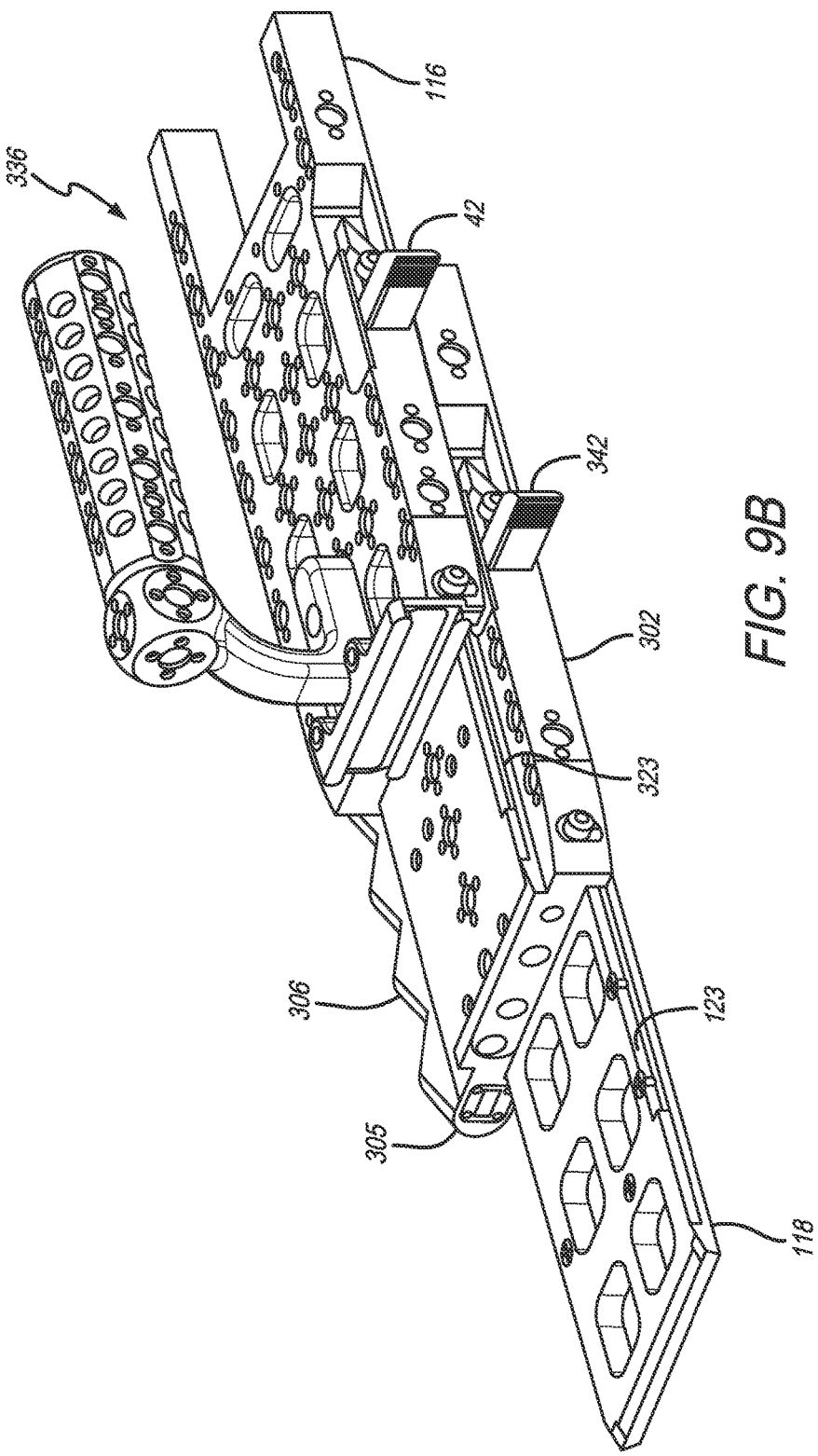
FIG. 9B shows a quick swap mounting plate and quick swap handheld top mount partially assembled with a power distribution plate.
Figure 9C:
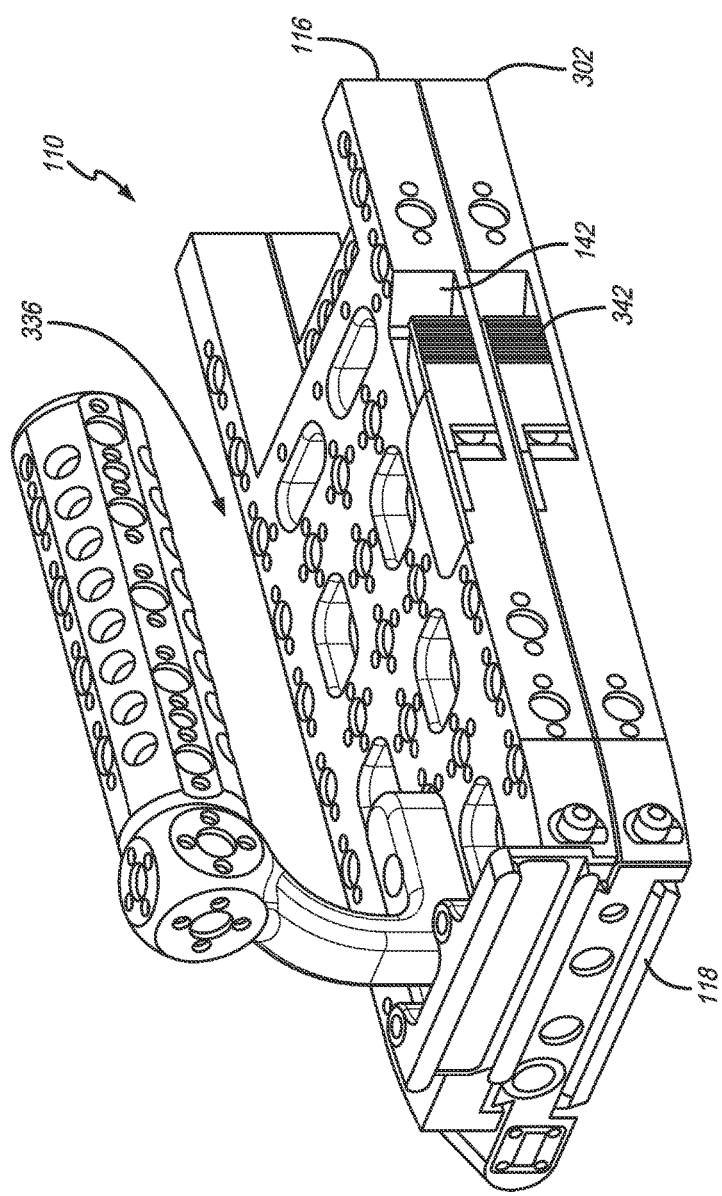
FIG. 9C shows a quick swap mounting plate and quick swap handheld top mount assembled with a power distribution plate.
Figure 10A:
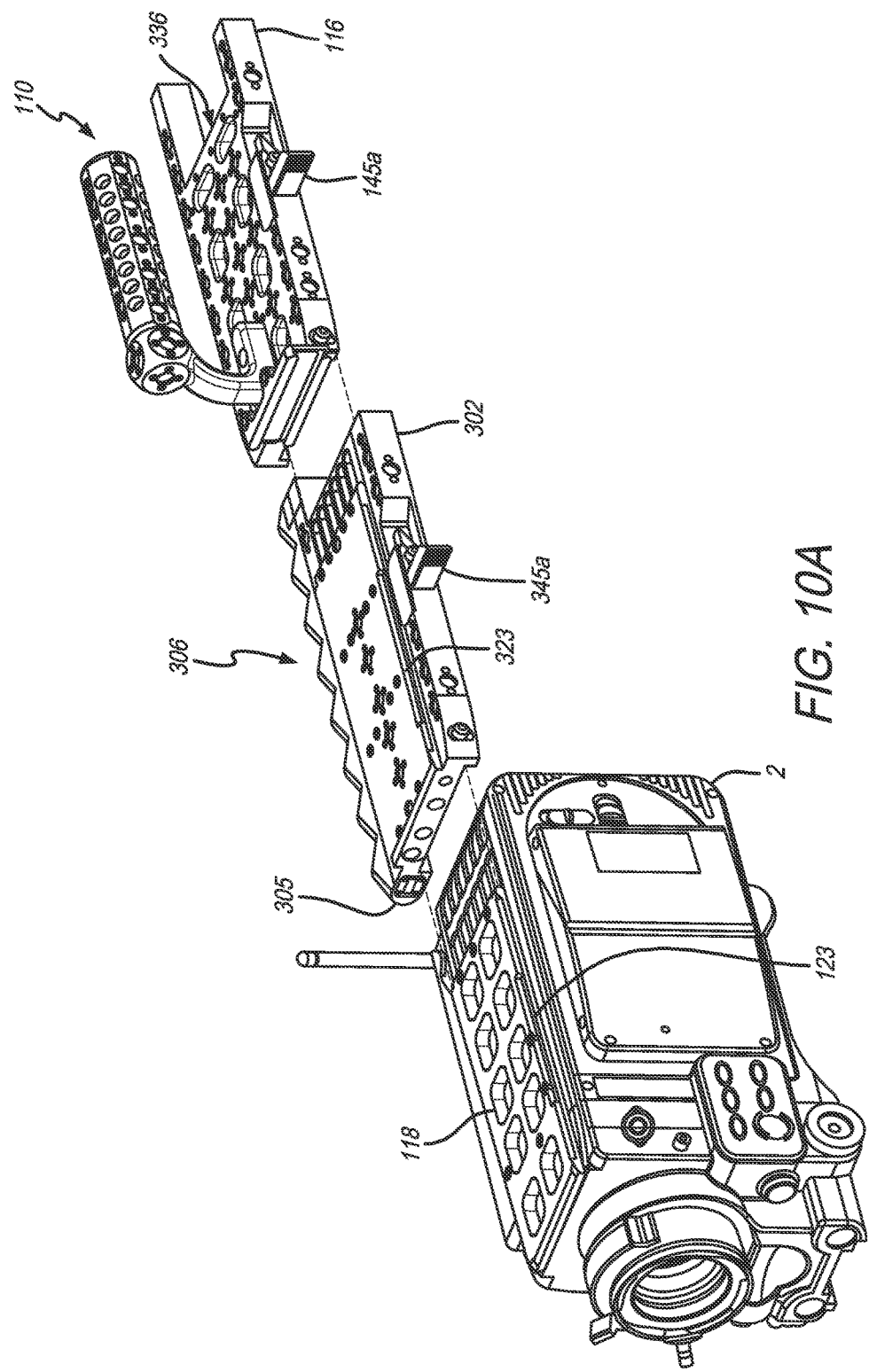
FIG. 10A shows a quick swap mounting plate mounted onto a camera, and a quick swap handheld top mount in alignment with a power distribution plate.
Figure 10B:
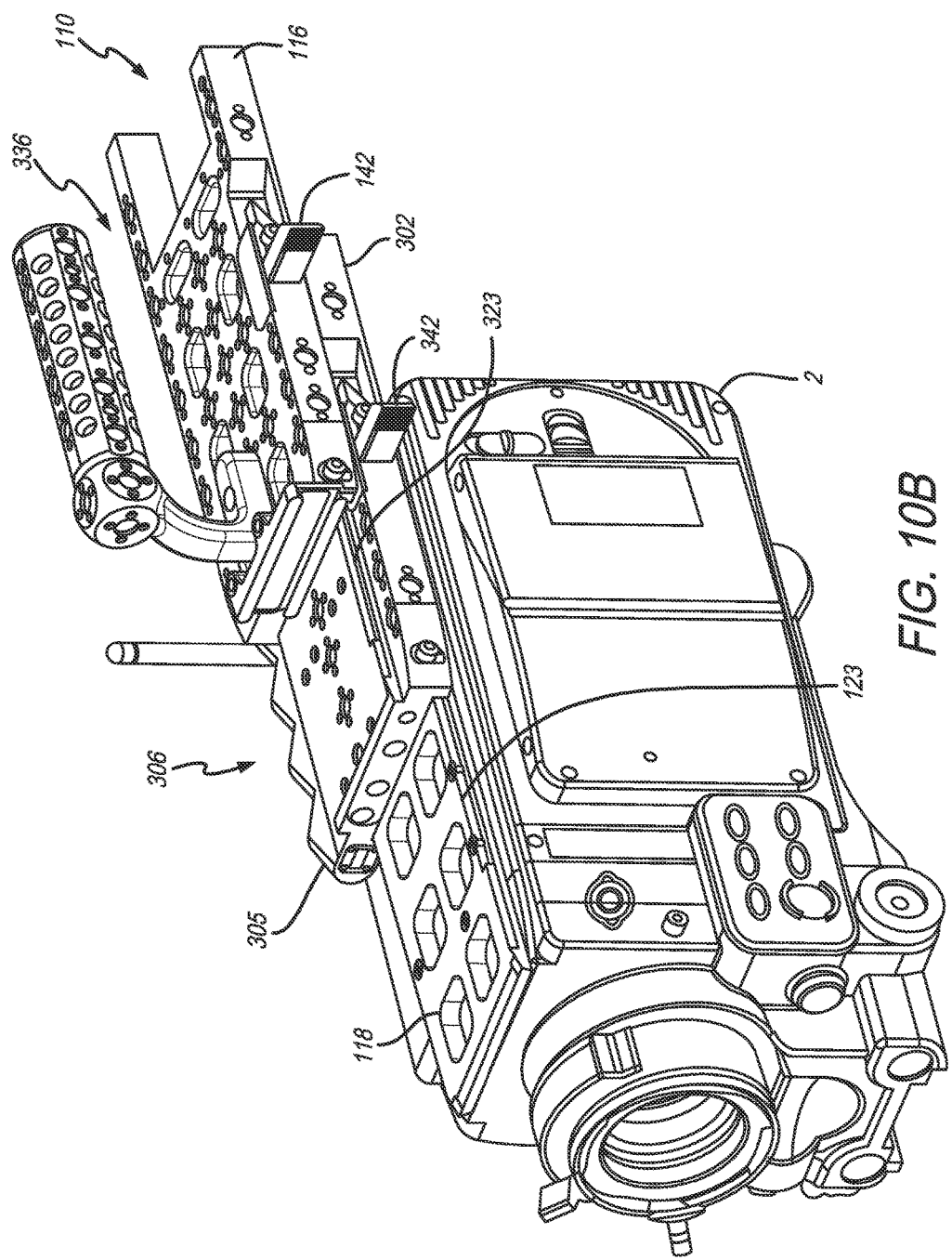
FIG. 10B shows a quick swap mounting plate mounted onto a camera and a quick swap handheld top mount partially assembled with a power distribution plate.
Figure 10C:
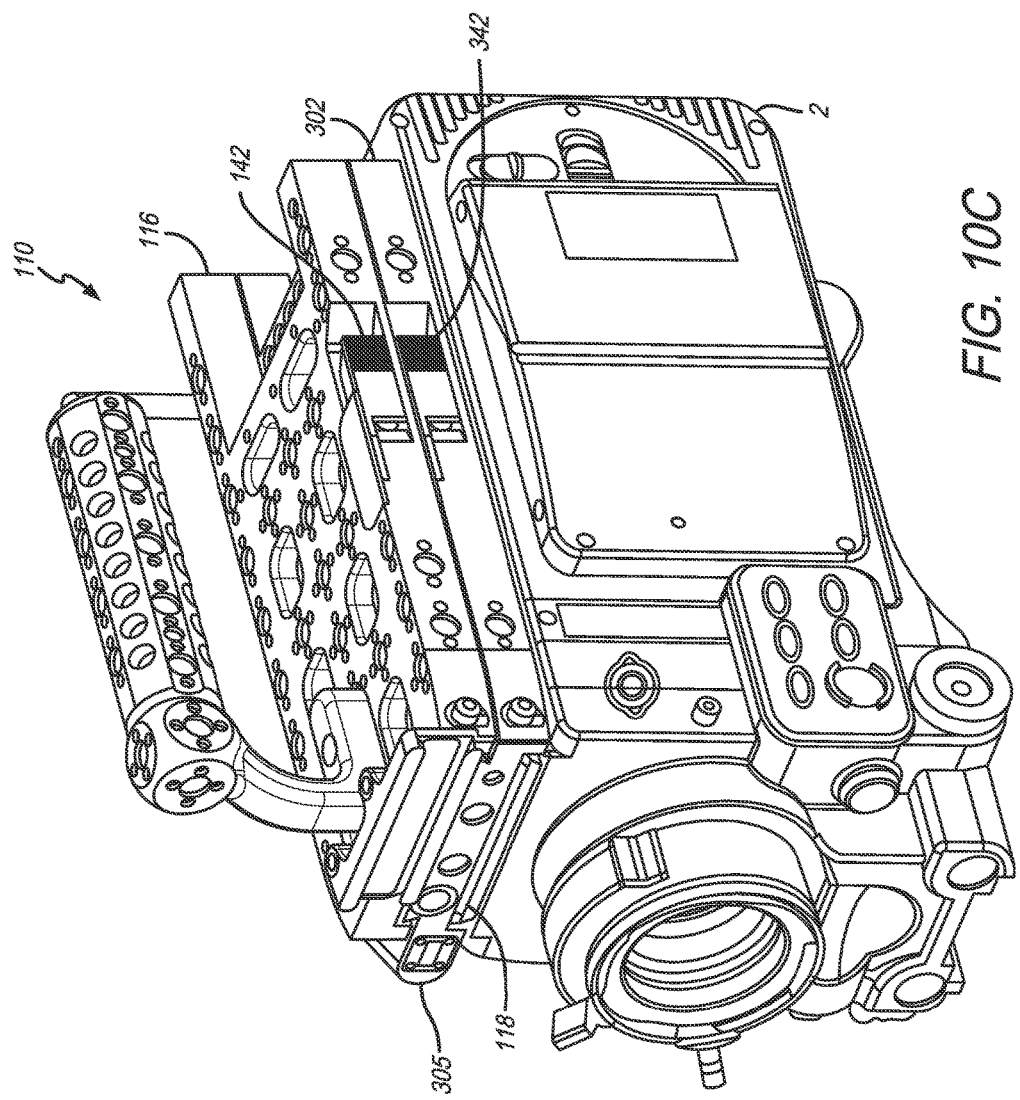
FIG. 10C shows a quick swap mounting, a camera, and a quick swap handheld top mount fully assembled with a power distribution plate.
Figure 11:
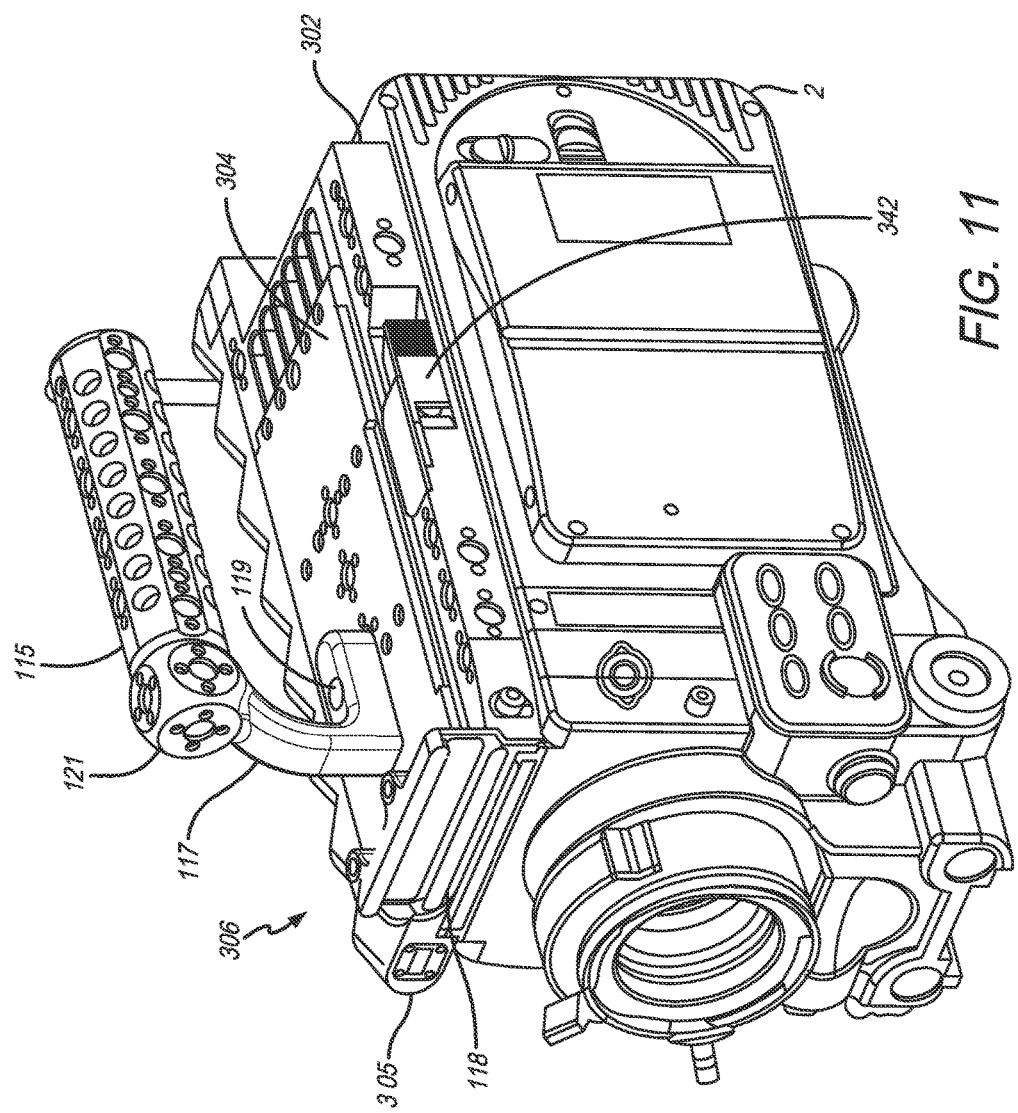
FIG. 11 shows a perspective view of a camera, power distribution plate, and a handle assembly.

The quick release and lock mechanism 342 of the power distribution plate 203, and the accessory plate 303 incorporates the same elements into a cavity 333 as the release and lock mechanism incorporated into the accessory plate 116. As shown in FIG. 12, these elements include a lever 344, one or more rotary elements 346 and a block 348. Each of these elements facilitates coupling and decoupling of the plates 203, 303 to a quick swap handheld top mount 110, or a quick swap mounting plate 118 FIG. 9A-9C show examples of how a mounting plate 118, a power distribution plate 302, a quick swap accessory plate 116 may be aligned and assembled. FIG. 10A-10C show examples of how a mounting plate 118, a power distribution plate 302, a quick swap accessory plate 118, and camera 2 may be aligned and assembled. FIG. 11 shows another alternative system arrangement. Here, a handle 114 is connected directly to a plate mounting surface 304, using a fastener 119.

While embodiments of this invention have been shown and described, it will be apparent to those skilled in the art that many more modifications are possible without departing from the inventive concepts herein. The invention, therefore, is not to be restricted except in the spirit of the following claims.

What is claimed:

1. A quick swap top mountable camera mount system for mounting onto a top surface of a camera, the system comprising:
    a rectangular quick swap mounting plate, comprising:
        an outer body portion having long sides and short sides that define the rectangular shape, wherein each long side includes a male alignment element, and wherein one long side includes an engagement surface extending along only a partial length of an outer edge surface of such long side along a center portion, wherein the engagement surface is a lip that extends inwardly a depth from the outer edge as defined by a recessed section that extends only along the partial length, wherein the engagement surface faces outwardly from the mounting plate, and wherein such engagement surface is configured differently from both the remaining outer edge surface of such long side and from opposed edge surfaces of such long side positioned adjacent the short sides; and
        an inner body portion having a plurality of bores with each bore having threads for coupling with fasteners and mounting onto a top surface of a camera; and
    a quick swap top mount configured to laterally mate with and mount on top of the mounting plate such that the mounting plate is positioned underneath of the mount, the quick swap top mount comprising:
        a quick swap accessory plate with an accessory plate platform having an accessory plate channel configured to receive the mounting plate, the channel including a female alignment element that laterally engages and cooperates with the male alignment element of the mounting plate, the accessory plate having a rectangular configuration with opposed long sides and opposed short sides, the accessory plate comprising a quick release and lock mechanism configured to engage the mounting plate and that is disposed within a recessed cavity along a long side surface of the accessory plate, the quick release and lock mechanism including a lever that is flush with the long side surface of the accessory plate and within the recessed cavity when in a locked state and that pivots outwardly from the cavity and extends outwardly from the long side surface when in an unlocked state, wherein the lever is attached with one or more rotary elements that extend in a perpendicular manner from a portion of the lever, wherein the one or more rotary elements are disposed within the cavity, the one or more rotary elements acting as an axle engaging the lever at one end and engaging a block disposed within the cavity at another end, where pivoting movement of the lever causes the block by operation of the one or more rotary elements to move upwardly or downwardly relative to the mounting plate, wherein downward and inward movement of the block by operation of the lever causes the block to engage with the engagement surface of the mounting plate disposed adjacent the accessory plate to provide the locked state, and wherein upward and outward movement of the block by reverse operation of the lever causes the block to disengage the engagement surface of the mounting plate disposed adjacent the accessory plate to provide the unlocked state.

2. The system of claim 1, wherein the quick swap top mount is a handheld mount comprising a handle connected to and projecting upwardly from a top surface of the quick swap top mount, the handle comprising at least one gripping area, and wherein the top surface of the quick swap top mount is positioned above a top surface of the camera.

3. The system of claim 1, wherein the quick swap accessory plate includes a cover disposed along a top surface of the accessory plate that at least partially covers a top portion of the recessed cavity to protect interior components of the quick release and lock mechanism.

4. The system of claim 1, wherein the quick swap top mount is a low mode mount configured to connect with a body-mounted camera stabilizing system.

5. The system of claim 4, wherein the quick swap low mode mount comprises a docking block attached thereto, and one or more mount adjustment elements connected with the docking block.

6. The system of claim 1, further comprising a power distribution plate disposed on top of the camera and interposed between the quick swap mounting plate and the quick swap top mount, wherein the distribution plate is configured to mate with both the mounting plate and top mount.

7. The system of claim 6, wherein the power distribution plate comprises at least one quick release and lock mechanism disposed within a recessed cavity along a long side surface of the power distribution plate, the quick release and lock mechanism comprising a lever that is attached with one or more rotary elements disposed within the cavity, the one or more rotary elements acting as an axle engaging the lever and a block disposed within the cavity, where movement of the lever into a locked state causes the block to move downwardly and inwardly towards the mounting plate to engage an adjacent portion of the mounting plate, the lever being flush with the long side surface and disposed within the recessed cavity when the quick release and lock mechanism is in a locked state.

8. The system of claim 1, wherein the accessory plate platform further comprises at least one plate extension extending outwardly from a side surface of the accessory plate.

9. The system of claim 8, further comprising a power distribution plate disposed on top of the camera, wherein the power distribution plate comprises a power distribution plate channel configured to receive the quick swap mounting plate, the power distribution plate channel including a female alignment element that mates with the male alignment element of the quick swap mounting plate.

10. The system of claim 9, wherein the power distribution plate includes a quick release and lock mechanism configured to engage the quick swap mounting plate and that is disposed within a recessed cavity along a long side of the power distribution plate parallel with a long side of the mounting plate, the quick release and lock mechanism including a lever that is flush with the long side of the quick swap mounting plate and within the recessed cavity when in a locked state and that pivots and extends outwardly from the recessed cavity when in an unlocked state.

11. A quick swap top mounted camera mount system, comprising:
  a camera;
  a quick swap mounting plate attached to a top surface of the camera, comprising:
    an outer body portion having long sides and short sides, wherein each long side includes a male alignment element, and wherein one long side has an outer surface facing outwardly from the mounting plate and such outer surface includes an engagement surface extending along only a center portion of such long side outer surface formed from an inwardly recessed portion, and wherein a remaining portions of such long side outer surface as well as opposed edges of such long side outer surface adjacent the short sides are configured differently from the engagement surface; and
    an inner body portion having a plurality of bores with each bore having threads for coupling with fasteners and mounted onto a camera top surface; and
  a quick swap accessory plate configured to laterally mate on top of the quick swap mounting plate such that the mounting plate is positioned underneath the accessory plate, the accessory plate, comprising:
    an accessory plate platform having a rectangular configuration with opposed long sides and opposed short sides and having an accessory plate channel configured to receive the quick swap mounting plate, the channel including a female alignment element that laterally mates with the male alignment element of the quick swap mounting plate and one or more quick swap coupling elements configured to engage and mount on top of the quick swap mounting plate, wherein one of the quick swap coupling elements comprises a quick release and lock mechanism configured to engage the mounting plate and that is disposed within a recessed cavity along a long side surface of the accessory plate, the quick release and lock mechanism including a lever that is flush with the long side of the accessory plate and within the recessed cavity when in a locked state and that pivots and extends outwardly from the recessed cavity when in an unlocked state, wherein the lever is attached with one or more rotary elements that extend in a perpendicular manner from a portion of the lever, wherein the one or more rotary elements along with an attached portion of the lever are disposed within the cavity, the one or more rotary elements acting as an axle engaging the lever and a block disposed within the cavity, where in the locked state the block is interlocked with the engagement surface of the mounting plate.

12. The system of claim 11, further comprising a handle connected to a top surface of the accessory plate platform that is opposite the top surface of the camera, wherein the handle extends over the accessory plate platform top surface.

13. The system of claim 11, wherein accessory plate further comprises a cover disposed long a top surface adjacent the recessed cavity that operates to at least partially cover components of the quick release and lock mechanism disposed within the recessed cavity.

14. The system of claim 11, wherein the quick swap accessory plate is connected with a body-mounted camera stabilizing system.

15. The system of claim 14, wherein a docking block and one or more mount adjustment elements are connected with the quick swap accessory plate.

16. The system of claim 11, further comprising a power distribution plate disposed on top of the camera and configured to mate with and be mounted on top of the quick swap mounting plate, the power distribution plate being interposed between the mounting plate and the accessory plate and comprising one or more attachments for accommodating power distribution.

17. The system of claim 16, wherein the power distribution plate comprises at least one quick release and lock mechanism.

18. The system of claim 17, wherein the distribution plate quick release and lock mechanism is configured to engage the mounting plate and is disposed within a recessed cavity along a side surface of the distribution plate, the quick release and lock mechanism including a lever that is flush with the side of the distribution plate and within the recessed cavity when in a locked state and that pivots and extends outwardly from the recessed cavity when in an unlocked state, wherein the lever is attached with one or more rotary elements extending in a perpendicular manner from a section of the lever, wherein the one or more rotary elements are disposed within the cavity, the one or more rotary elements acting as an axle engaging the lever and a block disposed within the cavity, where movement of the lever into a locked state causes the block to move downwardly and inwardly towards the mounting plate to engage an adjacent portion of the mounting plate, the lever being flush with the long side surface and disposed within the recessed cavity when the quick release and lock mechanism is in a locked state.

19. The system of claim 18, wherein the power distribution plate comprises a power distribution plate channel configured to receive the quick swap mounting plate, the power distribution plate channel including a female alignment element that mates with the male alignment element of the quick swap mounting plate.

20. The system of claim 18, wherein the power distribution plate includes a side wall having a series of undulations.

* * * * *